Patented Oct. 9, 1928.

1,687,268

UNITED STATES PATENT OFFICE.

ALBERT K. EPSTEIN, OF CHICAGO, ILLINOIS.

EGG PRODUCT AND PROCESS FOR PRODUCING THE SAME.

No Drawing.   Application filed December 24, 1926.   Serial No. 156,995.

My invention relates to egg products and process for producing the same, being directed more particularly to an egg yolk product, an object being to provide a product of the above character in which the yolk is treated by or combined with a suitable edible acid or acid producing substance capable of reducing the bacteria and other micro-organisms therein to a negligible number and prevent putrefaction and other forms of microbial decomposition.

In the production of frozen eggs the egg content is removed from the shell and the physical characteristics are observed with reference to odor and consistency. If the egg product shows signs of decomposition it is discarded. The eggs of an edible nature are thrown into a can and then mixed. If it is desired to obtain yolks only, the yolks are separated from the whites and the yolks and whites placed respectively in separate containers and mixed. The said egg products are then sometimes, in this fresh state and without further treatment, placed in refrigeration in order to freeze them to a solid mass so as to keep them from spoiling. When it is desired to use same, the cans are taken out of the refrigerating room and allowed to thaw out at ordinary room temperatures. This takes a long period of time depending upon the temperature of the room and usually from twenty-four to thirty hours. As soon as the eggs are removed from the shell during the period of preparing the egg for the freezing process as well as during the period of thawing and after the eggs have been thawed out, they are subject to a bacterial spoilage. Eggs even of the freshest kind contain a considerable number of organisms which enter the egg shell from extraneous sources and penetrate to the egg substance through the pores of the shell and even with very great care the contents of the egg may be contaminated with various organisms from the fingers of the operators touching the shell. While these organisms may not be harmful to health, still if they are allowed to act upon the egg substance to decompose the same, it will become putrid and decomposed and unfit for human consumption.

I have found that this bacterial spoilage and putrefaction of the said eggs may be prevented by treatment with a substance of an acid nature or a substance which is capable of giving off hydrogen ions when in contact with egg material. This substance should be preferably of an edible nature. I have also found that in order to prevent bacterial spoilage of egg substances before freezing as well as after freezing, it is desirable to treat the egg substance with a certain amount of acid material of sufficient quantity in order to reduce the bacteria and other micro-organisms therein to prevent bacterial decomposition. The amount added should be sufficient to liberate enough hydrogen ions to prevent action of the bacteria on the yoke substance at ordinary room temperatures.

In the preferred form of my invention I treat or combine the yoke or the mixed eggs with an acid of the above character, preferably acetic, although other equivalent acids of the above character may be employed, such as citric, phosphoric, tartaric, lactic, malic or succinic. I do not limit myself to acids, as any other substance which contains the acids, such as concentrated lemon juice or powdered lemon juice, may be added as well as any other substance of an edible nature which is capable of giving hydrogen ions when contacting with the egg substance.

In the case of egg substance I add an amount of acid in sufficient quantity so as to reduce the bacteria or other micro-organisms to a negligible number and to prevent bacterial decomposition at ordinary room temperatures.

Acid treated yolk of the character herein referred to, after freezing and thawing, is of a high viscosity and low mobility, and is a firm jelly-like mass. Where greater mobility is desired so that the product will flow and be more readily incorporated with other ingredients in its final use, the acid treated product may be modified to a desirable extent as pointed out for instance in my copending application Serial No. 156,997, filed of even date herewith.

Referring now, for example, to one form of practicing my invention, I take so-called commercial egg yolk which is produced by separating the yolk from the white and then mixing the yolks into a mass. In such a product there is usually a relatively small amount of the white adhering to the yolk and with the exercise of ordinary care it is possible to obtain a product which consists essentially of yolks proper, with only a small amount of the white adhering to it. To a batch of ninety-nine and two-tenths (99.2) pounds of such commercial yolk, for example, I add eight-tenths (.8) of a pound of acetic acid or its equivalent, thoroughly mixing the same in a suitable mixer. This product may now be poured into cans and frozen or it may be further treated with other substances to modify the normal viscosity of the final product, that is the viscosity of the product after it has been frozen and thawed for subsequent use.

In the case of white, or whole egg, or any suitable mixture of yolk and white, a similar amount of acid is preferably used, although I do not limit myself to this quantity. The acid may also be added dissolved in water, or in any other suitable solvent or wetting substance.

I have referred to the use of eight-tenths of a pound of acid to ninety-nine and two-tenths pounds of yolk, but this may be varied and I have found that for general purposes one-half to one and one-half per cent by weight of the acid is sufficient.

Although I have given certain preferred ingredients and proportions, I contemplate practicing by invention in other ways than those specifically pointed out and therefore do not desire to be limited to the exact ingredients and proportions or methods of mixing described, but aim to cover all that which comes within the spirit and scope of the appended claims.

Furthermore, I contemplate modifying the acid treated yolk so as to secure other desirable characteristics such as by the use of salt, as pointed out and claimed in my application Serial No. 156,997, or by the use of sugar and salt as pointed out and claimed in my application Serial No. 156,998, both filed of even date herewith, and in other ways.

What I claim as new and desire to secure by United States Letters Patent is:—

1. The method of manufacturing a frozen egg substance consisting of adding to egg content an edible substance producing hydrogen ions when in contact with egg material and in sufficient proportion to materially modify the physical characteristic of the ultimate product after freezing and thawing and to substantially reduce bacterial decomposition when the egg content is at normal room temperature before freezing and during thawing, and freezing the final mixture.

2. The method of manufacturing a frozen egg substance consisting of adding to egg yolk an edible acid substance producing hydrogen ions when in contact with egg material and in sufficient proportion to materially modify the physical characteristic of the ultimate product after freezing and thawing and to substantially reduce bacterial decomposition when the egg yolk is at normal room temperature before freezing and during thawing, and freezing the final mixture.

3. The method of treating an egg substance consisting of adding to egg yolk substantially one-half to one and one-half per cent by weight of acetic acid and freezing the final mixture and keeping frozen until desired for use and then thawing.

4. As a new article of manufacture, a frozen product including egg content combined with an edible substance producing hydrogen ions when in contact with egg content and in sufficient proportion to materially modify the physical characteristic of the ultimate product after freezing and thawing and to substantially reduce bacterial decomposition when the egg content is thawed out at normal room temperature.

5. As a new article of manufacture, a frozen product including egg yolk combined with an edible acid and in sufficient proportion to materially modify the physical characteristic of the ultimate product after freezing and thawing and to substantially reduce decomposition when the egg yolk is thawed out at normal room temperature.

6. The method of producing an egg substance of a soft consistency by treating egg yolk with an edible acid, capable of and in sufficient quantity to reduce bacterial action at ordinary room temperature and produce an ultimate product having a soft consistency after freezing and thawing, freezing the product until desired for use, and then thawing it.

7. As a new article of manufacture, an egg product in a soft state, preliminarily frozen, and including egg content combined with an edible acid capable of and in sufficient proportion to materially modify the physical characteristic of the ultimate product and substantially reduce bacterial decomposition when the product is at normal room temperature before freezing and during thawing.

8. As a new article of manufacture, an egg product in a soft state, preliminarily frozen, and including essentially egg yolk combined with an edible acid capable of and in sufficient proportion to materially modify the physical characteristic of the ultimate product and substantially reduce bacterial decomposition when the product is at normal room temperature before freezing and during thawing.

In witness whereof, I hereunto subscribe my name this 18th day of December, 1926.

ALBERT K. EPSTEIN.